P. G. MASON.
REFLEX PHOTOGRAPHIC CAMERA.
APPLICATION FILED AUG. 17, 1920.
1,416,854.                                Patented May 23, 1922.
                                              7 SHEETS—SHEET 3.
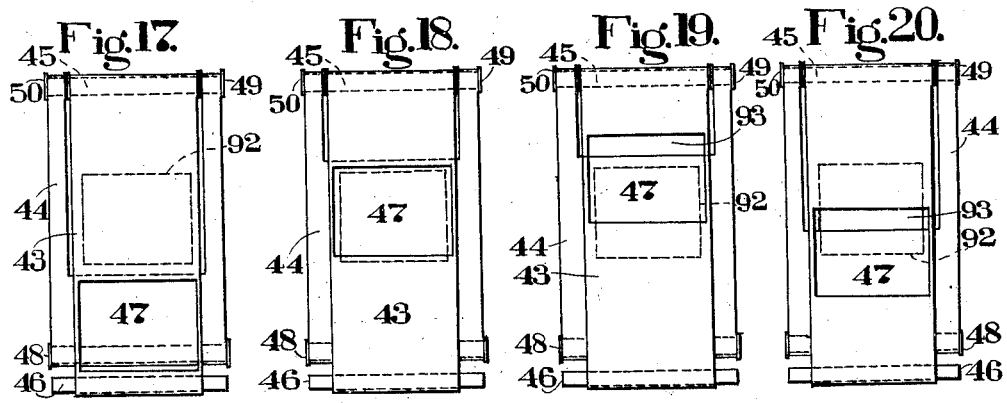
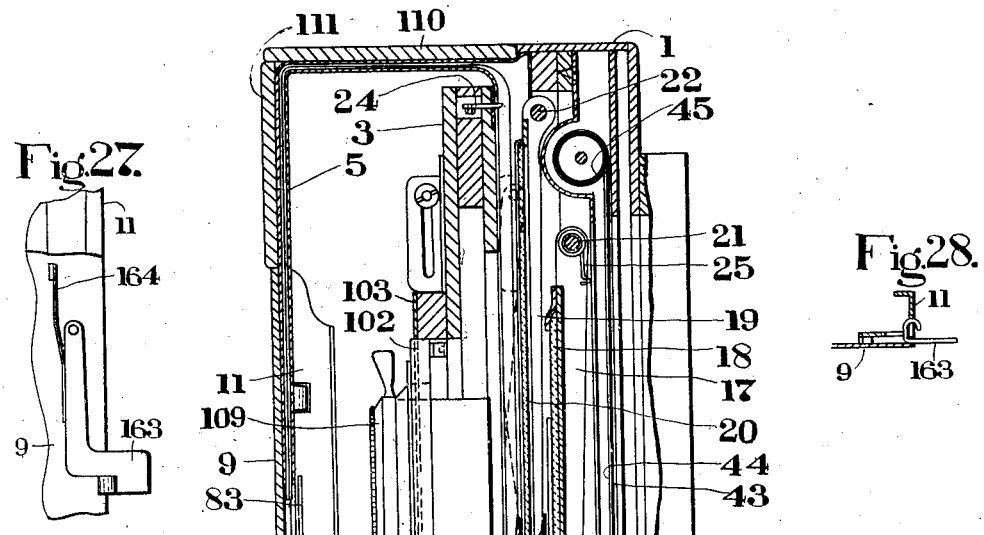
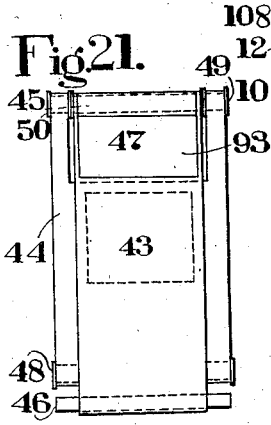
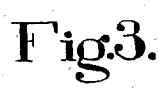
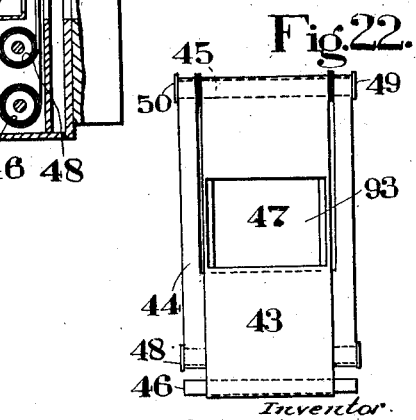

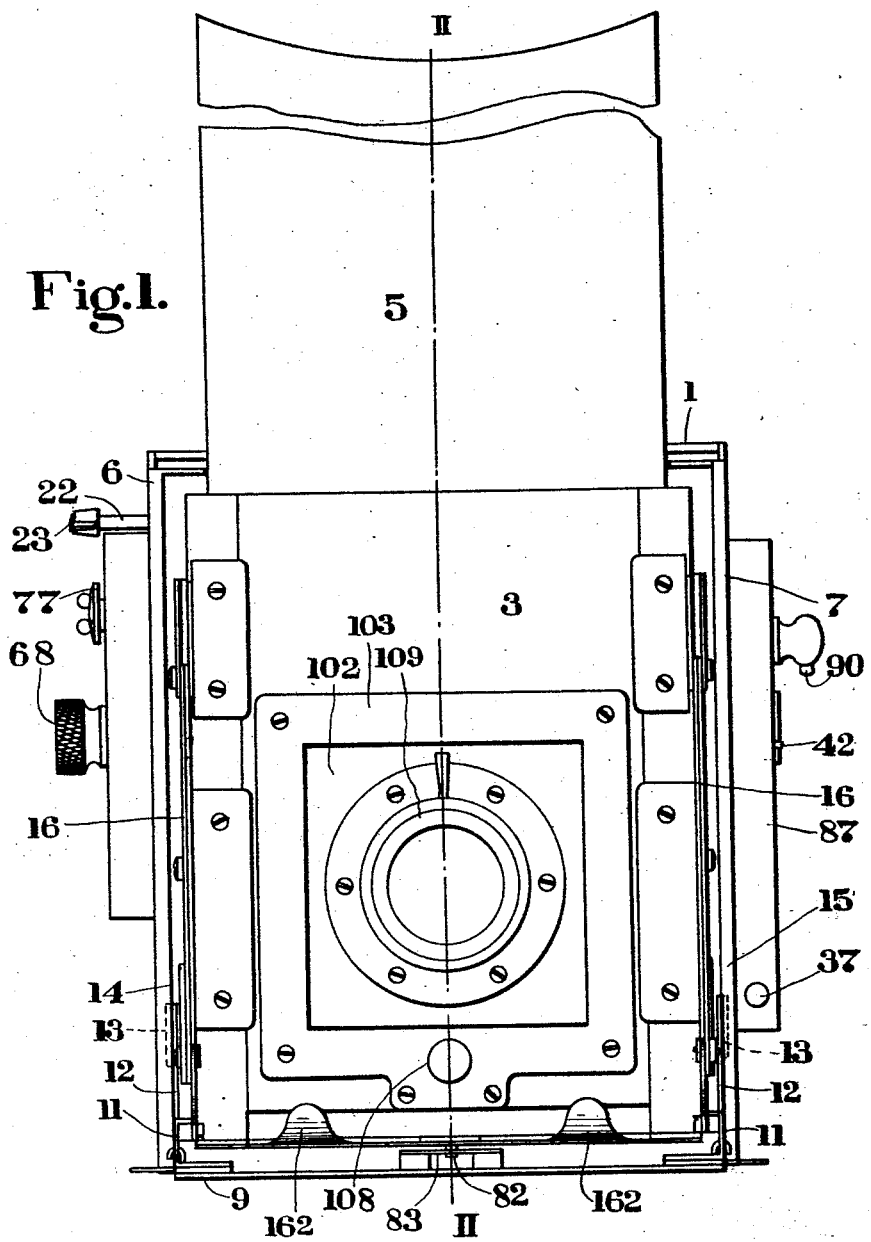

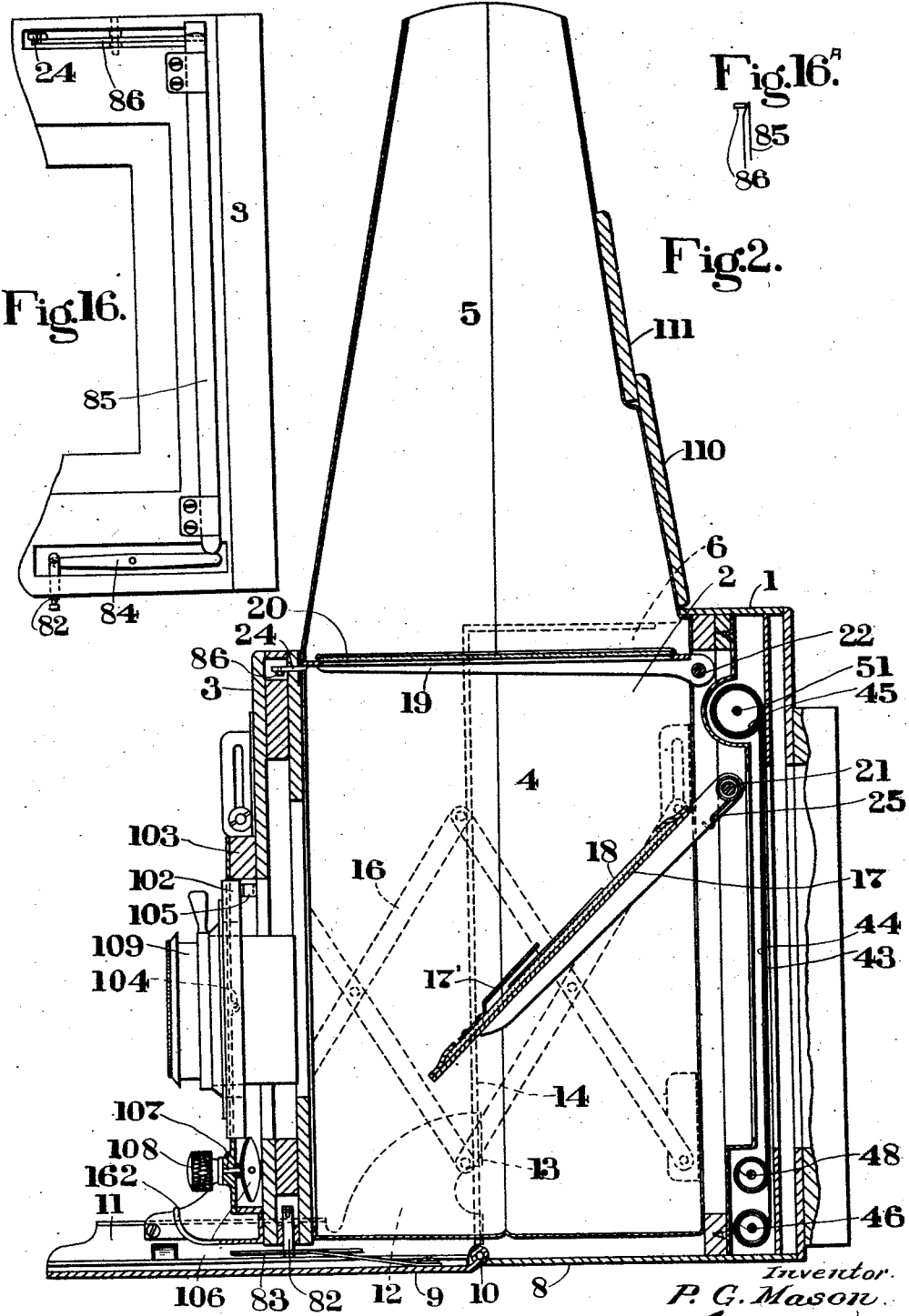

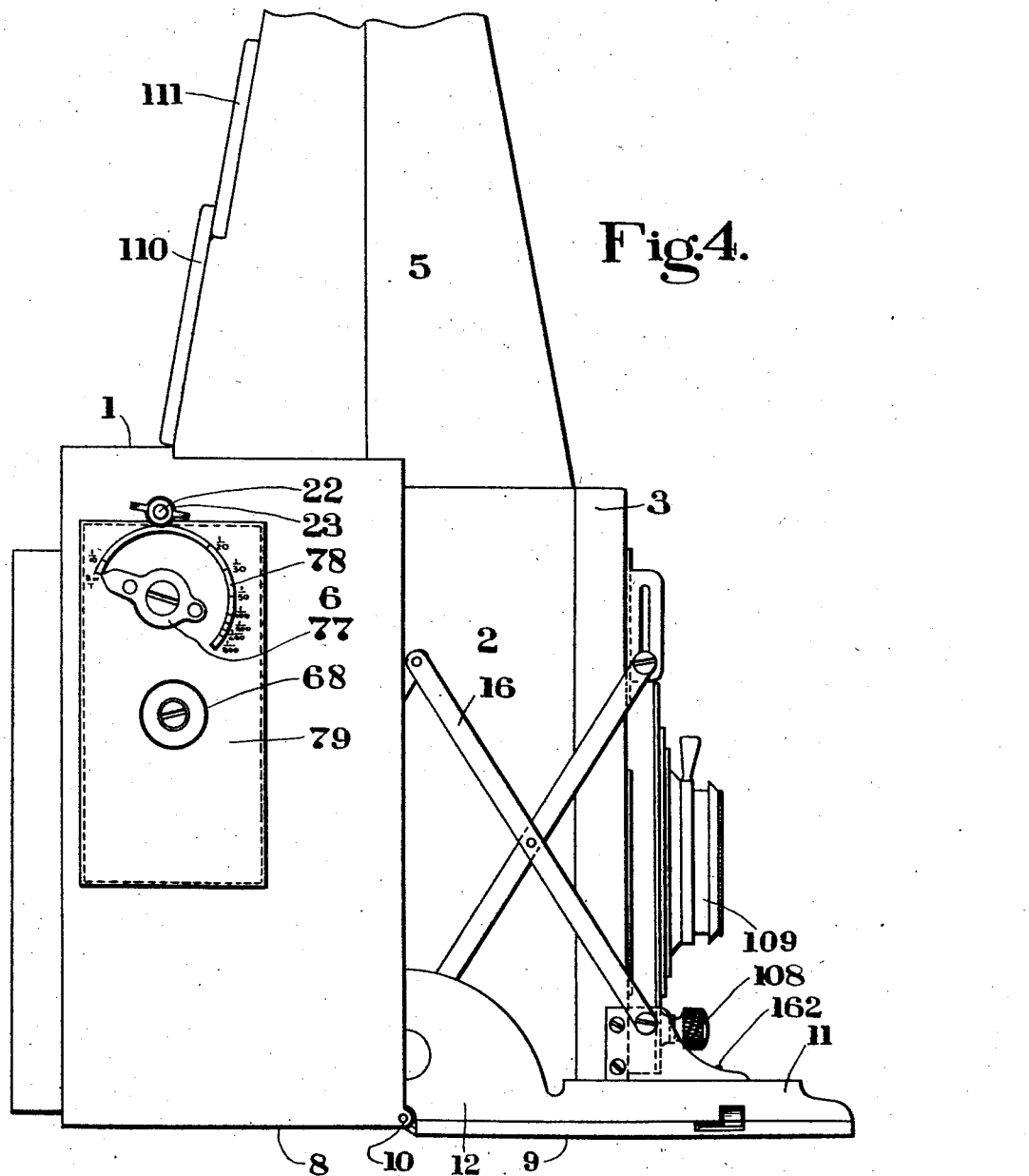

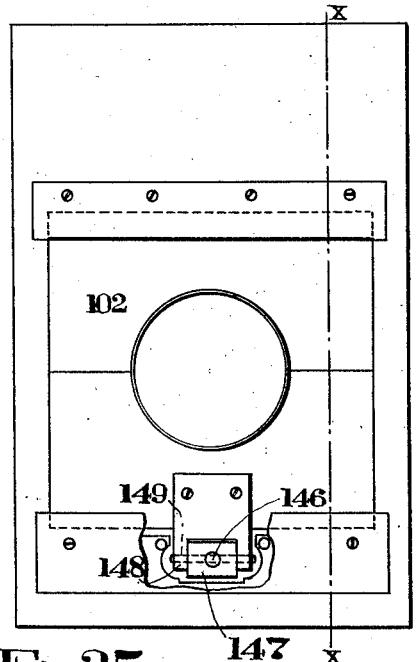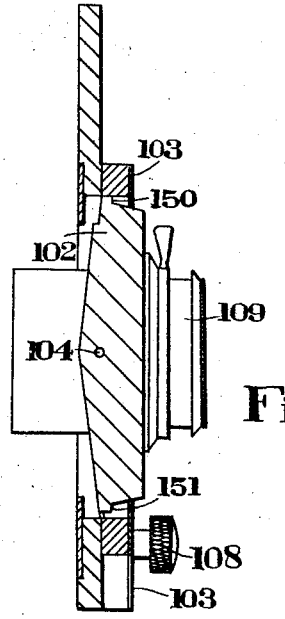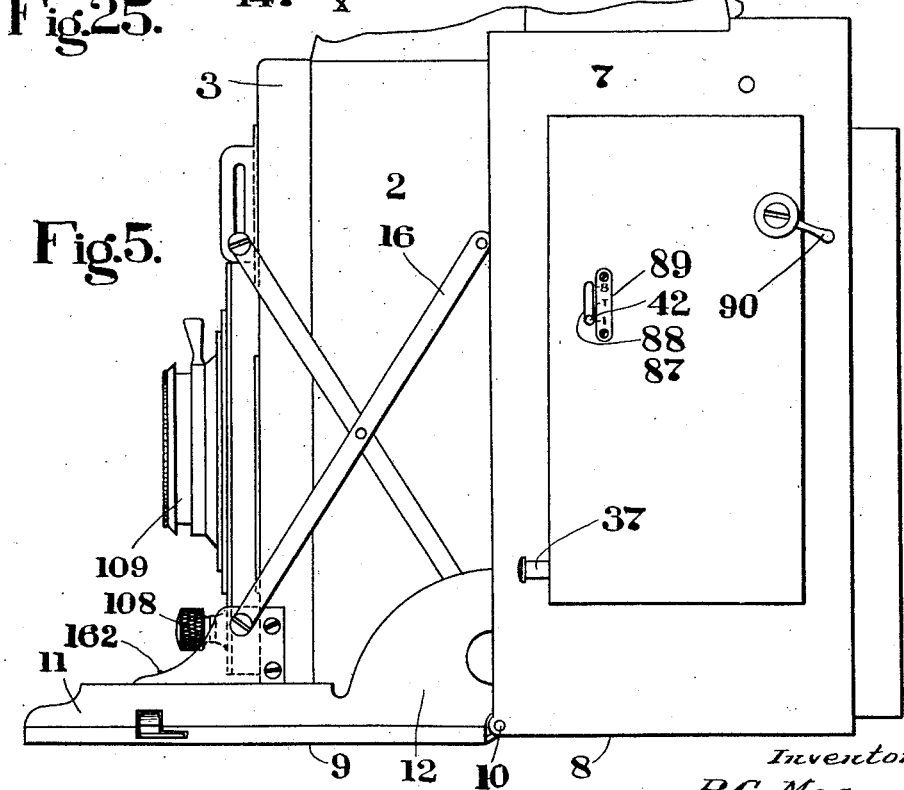

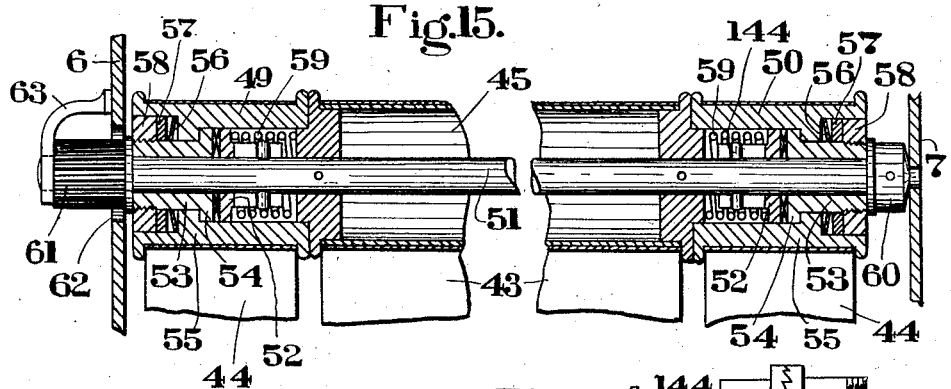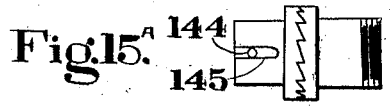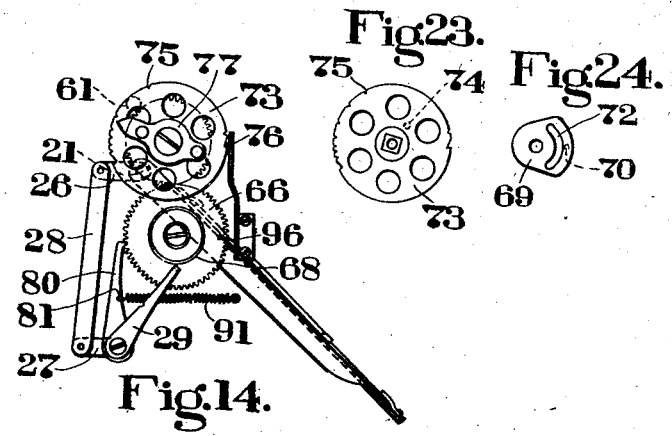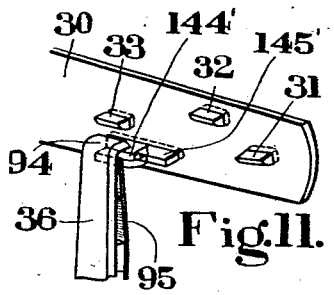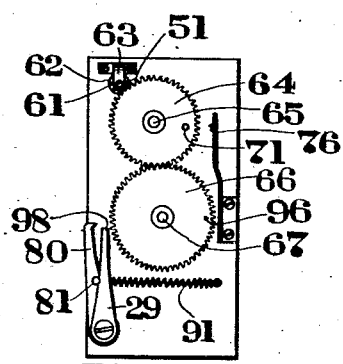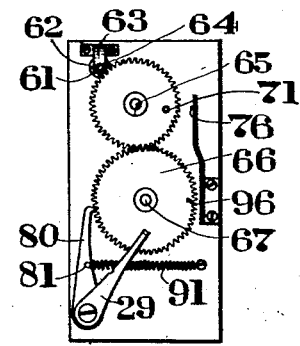

UNITED STATES PATENT OFFICE.

PERCY GEORGE MASON, OF LONDON, ENGLAND, ASSIGNOR TO NEWMAN & GUARDIA, LIMITED, OF LONDON, ENGLAND.

REFLEX PHOTOGRAPHIC CAMERA.

1,416,854.        Specification of Letters Patent.      Patented May 23, 1922.

Application filed August 17, 1920. Serial No. 404,143.

*To all whom it may concern:*

Be it known that I, PERCY GEORGE MASON, a subject of the King of Great Britain and Ireland, residing at London, England, have invented certain new and useful Improvements in and Relating to Reflex Photographic Cameras, of which the following is a specification.

This invention relates to improvements in folding or collapsible reflex cameras of the type in which a focussing screen and a mirror are pivoted on adjacent edges, so that they can be moved from their operative positions into substantially vertical parallel relation within the casing or body of the camera to permit of the camera front being thrust inwards, towards the casing when the camera is to be collapsed, the usual hood on the upper part of the casing being folded down over the lens plate.

In cameras of this type it has hitherto been usual to provide a lens plate in addition to the camera front, but connected thereto by a bellows so as to permit of adjustment of the lens plate for focussing purposes. This arrangement results in a greater length—from front to rear—of the camera when collapsed than is desirable. Moreover, the provision of roller blind shutter mechanism, adapted to co-operate with the mirror, has been such as to require considerable space measured from the front to rear of the camera casing.

The object of the present invention is to produce a camera of the above type which can be folded or collapsed very easily and rapidly into a comparatively shallower depth—from front to rear—and will be such that it can be easily and rapidly opened or distended and when so distended will be rigid and permit of easy manipulation of the mirror and shutter mechanism which is such that it occupies less space than hitherto and moreover is easily accessible for inspection or repair.

According to the invention in a folding or collapsible reflex camera of the above type the lens, with suitable focusing tube, is mounted on the camera front, the hood and its lower extension being directly connected to said front and to the camera casing, whereby the camera can be collapsed with the lens plate and hood housed within the camera casing which can be shallower than hitherto. The mechanism for winding the shutter, for setting the shutter and for controlling the release, is mounted exteriorly of the casing on the two sides thereof, and is of such construction that it occupies little space and is easily accessible for inspection or repair, while being efficient in action as hereinafter particularly described.

In the drawings:—

Figure 1 is a front elevation of the camera extended.

Figure 2 is a side sectional elevation on line II—II Figure 1.

Figure 3 is a side sectional elevation showing the camera collapsed.

Figures 4 and 5 are right and left hand side elevations of the camera in the extended position.

Figure 11 is a perspective view of part of the timing and stop levers, hereinafter referred to.

Figures 12 and 13 are side elevations of the shutter winding mechanism with the shutter setting device removed.

Figure 14 is a side elevation of the shutter winding and setting mechanism detached from the camera, showing the connection between it and the mirror spindle.

Figure 15 is a front sectional elevation of the top shutter rollers.

Figure 6:
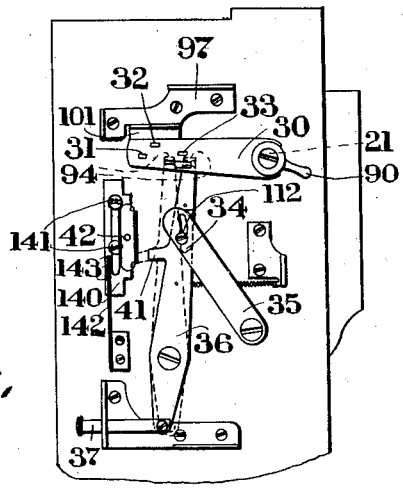
Figures 6 and 7 are side elevations showing the positions of the shutter actuating mechanism with the casing thereof removed for instantaneous exposure.

Figure 15$^a$ being a plan of a detail connected therewith.

Figure 16 is a front elevation of part of the front plate of the camera with lens plate removed, showing the device for releasing the focussing screen.

Figure 16$^a$ being a side view of a detail connected therewith.

Figures 17 to 22 are views illustrating the various relative positions of the shutter blinds.

Figures 23 and 24 are views showing details of the shutter setting mechanism.

Figures 25 and 26 are respectively a rear elevation and a sectional side elevation of a modified form of lens plate the section being taken on X—X Figure 25.

Figures 27 and 28 are detail views of a catch for the tail board.

In carrying out the invention according to one mode, by way of example, as illustrated in Figures 1 to 5 of the drawings, a comparatively shallow main body 1, adapted to receive a sensitive plate or film, and carrying the shutter and its mechanism, is connected by folding walls 2 and bottom 2' to a front or lens plate 3 so forming the dark chamber 4. The dark chamber 4 opens at the top into a focussing hood 5, which is preferably formed in one with the walls 2 of the dark chamber. The side walls 6 and 7 and base 8 of the main body 1 extend over part of the flexible walls 2 and bottom 2' and a tail board 9 is hinged at 10 to the extended base 8 to permit inward and outward sliding movement of the lens plate 3, which movement is guided by guides 11 on the tail board 9, as is well known in the art. The extended side walls 6, 7, of the main body 1, serve to house the front plate 3 in the extreme inward position, that is to say, when the camera is folded or collapsed as shown in Figure 3.

The guides 11 on the tail board are formed at their inward ends into sector shaped plates 12 having inturned edges 13. These edges 13 are adapted to engage with the inturned edges 14 and 15 of the sides 6 and 7 of the main body 1, thus preventing the dropping of the tail board 9 below a horizontal position.

A lazy tongs or trellis connection 16 is made on each side of the dark chamber between the sliding or front plate 3 and main body 1 of the camera; which method of connection is well known in the art, and needs no further description here.

A frame 17 carrying a mirror 18 and a frame 19 carrying a focussing screen 20, such as for example a ground glass screen of the usual form, are mounted on spindles 21 and 22 carried in the main camera body 1. The pivoting axis of the mirror frame is behind and below that of the frame carrying the focussing screen, so that when the mirror and screen are not required for use, that is in the folded or collapsed position of the camera, the two frames depend vertically from their pivoting spindles, so that the screen lies over the mirror, as illustrated in Figure 3 of the drawings. Light plate springs 17' are provided on the mirror frame 17 to prevent the screen frame 19 damaging the mirror 18 when the camera is being collapsed. These springs may be fitted in the ground glass screen frame 19, and stop pins may be provided on the frame adapted to hold the screen a definite distance from the mirror after the springs have cushioned the blow and have yielded.

When the camera is opened or extended the frame 19 carrying the screen 20 is moved about its axis by any suitable means such as an external winged nut 23 secured to the pivoting axle 22, so that it extends over the opening between the dark chamber 4 and focussing hood 5, as shown in Figure 2, and is automatically retained in this position by a suitable catch 24 carried by the front or sliding plate 3 and hereinafter described. The screen thus forms a tie between the main body 1 of the camera and the front or sliding plate 3, in this way ensuring rigidity of the camera in the extended position.

When the front plate 3 of the camera is brought forward into the extended position a pin 82 projecting from its under side comes into engagement with a slot in the spring catch 83 secured to the hinged tail board 9, as shown in Figures 1 and 2. This pin 82 as shown in Figure 16 is connected to the catch 24 through the medium of the pivoted lever 84, rod 85 and second pivoted lever 86. The rod 85, at the end in contact with the lever 86, is sloped or bevelled as shown in Figure 16ª, so that when the pin 82 is pulled down by pressing the spring catch 83, and the rod rises, the bevelled end acts on the end of the lever 86, oscillating it so as to bring the catch 24 within the front or sliding plate 3, thus releasing the frame 19 carrying the focussing screen 20.

When the focusing screen 20 is moved into the horizontal position as described the mirror frame 17, carrying the mirror 18, is moved about its pivotal axis by means of a spring 25 in the same direction as that of the focussing screen, until it reaches a position at which it is at an angle of 45 degrees to the horizontal axis of the lens, whereupon further movement is prevented as will be hereinafter described. In this position the mirror will reflect the image from the lens on to the focusing screen 20. The mirror spindle 21 is connected at one end adjacent to the side 6 of the camera by means of cranks 26, 27, and a link 28 to a lever 29 as illustrated in Figure 14, which under certain conditions, to be described hereafter, effects the release of a self-capping focal plane shutter.

The other end of the mirror spindle 21 is provided with a lever 30, hereinafter referred to as the stop lever. As illustrated in Figures 6 to 11 of the drawings the stop lever 30 is provided with three stops 31, 32, and 33, these stops being arranged in spaced relation, with the centre stop 32 arranged above the other two.

The stop 31 is adapted to engage with a latch stop 34 on a second pivoted lever 35, when the mirror is at an angle of 45 degrees, thus retaining the mirror in this position as previously mentioned. The latch stop 34 shown is formed by pressing out a portion of the lever 35. The movement of this second pivoted lever 35 is controlled by a pivoted timing lever 36 having a pin and slot connection 112 with the said lever 35, the timing lever 36 being connected with a slidable operating pin 37 capable of sliding movement in a guide 38 secured to the side 7 of the camera body 1. The timing lever 36 and the operating pin 37 move against the action of a spring 39 connected at its ends to the said lever 36 and to a plate 40 secured to the side 7 of the camera body 1. The upper end of the lever 36 is bent over to form a stop 94 as shown in Figure 11 a thin steel plate spring 95 being attached to the lever 36 with its adjacent end in spaced relation to the stop 94. The stop 94 is adapted to come into engagement with the stops 31, 32 and 33, on the stop lever 30 under certain conditions yet to be described. The spring 95 acts as a detent to prevent oscillation of the lever 30 after engagement of any of the stops 31, 32, 33 with the underside of the stop 94, the spring 95 yielding to the stops as they wipe over it into engagement with the stop 94 and snapping into position beneath said stops 31, 32, 33 immediately they are engaged. A cam 144' on the lever 30 presses the spring 95 into an inoperative position when the lever 36 is in the normal position ready to allow the lever 30 to move downward to permit of the mirror falling into its operative position. The spring 95 also holds the lever against oscillation during "instantaneous" operation of the shutter, hereinafter described, the spring 95 then being beneath the stop 145' on the lever 30 and the stop 94 above it as indicated in dotted lines in Figure 6.

The release of the shutter to give a "time" or "instantaneous" exposure is dependent on the degree of oscillation of the timing lever 36 and consequently on the amount of sliding movement of the operating pin 37. In order, therefore, to limit this sliding movement as required, a stepped plate 140 is provided having three steps 98, 99 and 100. The plate 140 is slidably mounted on screws 141 on the side 7 of the camera body 1 so that it can be moved into the path of a projection 41 on the pivoted timing lever 36, and is provided with a pin 42 for indication purposes as will be hereinafter described. The position of adjustment of the plate 140 is determined by a spring catch 142 entering any one of a series of holes 143 in the plate.

A casing 87 is provided to enclose the mirror actuating mechanism on the side 7 of the camera body 1 and a slot 88 is cut in said casing to allow the pin 42 to project through it, a suitable indication scale 89 being provided. The end of the mirror spindle 21 also projects through the casing 87 and is provided on its end with a handle 90.

The shutter, shown in Figures 2 and 3 and Figures 15 and 17 to 22, may be mounted in an independent frame screwed or otherwise secured to the back of the camera casing. It comprises two super-imposed roller blinds 43, 44. The blind 43 is carried by a roller 45 at its upper end and by a spring roller 46 of the usual type well known in the art, at its lower end, and has a rectangular opening 47. The blind 44 is carried by a spring roller 48 at its lower end and at its upper end by two small rollers 49 and 50, the blind being cut away at this end so as only to leave two marginal strips as shown in Figures 16 to 22, each of these strips being attached to one of said rollers 49 and 50. The spring rollers 46 and 48 are carried in the main camera body 1 or in a removable frame screwed or otherwise secured thereto, and the rollers 45, 49 and 50 are all mounted on one spindle 51 and are adapted to move relatively to one another as will now be described.

The roller 45 is pinned on the spindle 51 and is situated between the two smaller rollers 49 and 50 illustrated in Figure 15. The rollers 49 and 50 are each connected to the spindle 51 by means of a combined ratchet and friction clutch situated within it. This consists of a ratchet clutch member 52 which is adapted to rotate with the spindle 51 at the same time being capable of slight longitudinal sliding movement thereon, a pin 144 on the spindle entering a slot 145 in the clutch member 52. Another ratchet clutch member 53 is mounted freely on the spindle 51. A shoulder 54 on the clutch member 53 engages with a shoulder 55 on the inside of the roller 49 or 50. Pressing against the other side of the shoulder 55 is a spring washer 56 which is held in place by a washer 57 and a nut 58, screwed on to the screw threaded projecting end of the clutch member 53. A spring 59 presses the ratchet clutch member 52 into engagement with the member 53. A collar 60 and pinion 61 whose function is now to be described, are pinned to the opposite ends of the shaft or spindle 51 and thus serve to prevent longitudinal movement of the rollers 49 and 50 thereon.

The spindle 51 is carried at one end by the side 7 of the main camera body 1 or in a removable frame screwed or otherwise secured thereto. The pinion 61, secured to the end of the spindle 51 projects through a hole 62 in the side 6 of the camera body, the end of the spindle projecting slightly beyond the pinion 61 being carried by a bearing 63, secured to the side 6 of the camera body as illustrated in Figures 12, 13 and 15. The pinion 61 engages with a gear wheel 64 which rotates freely on a shaft 65 fixed to the side 6 of the camera body or to a removable frame screwed or otherwise secured thereto, the gear wheel 64 engaging in turn with another gear wheel 66 which is provided with a projecting stop 96 adapted to come into engagement with the bent over end 98 of the lever 29, and rotates on the shaft 67 also fixed to the camera body or to a removable frame screwed or otherwise secured thereto. A detent 80 mounted on the same shaft as the lever 29, is drawn by a spring 91 towards the teeth of the gear wheel 66. A pin 81 projects from the pawl 80. A milled head 68 shown in Figures 1, 4, and 14, is secured to the gear wheel 64. Freely mounted on the shaft 65 is a sector shaped plate 69, which has projecting from its surface a pin 70 adapted to engage with a pin 71 projecting from the face of the gear wheel 64. An arcuate slot 72 is formed in the sector shaped plate 69. A disc 73 of the form illustrated in Figures 14 and 23 is freely mounted on the shaft 65. The disc 73 has a pin 74 which enters and slides in the arcuate slot 72 in the plate 69. In the periphery of the disc 73 are a number of notches 75 adapted to receive a spring detent 76 secured to the side 6 of the camera or to a removable frame carrying the shutter rollers and screwed or otherwise secured to the side of the camera. Attached to the disc 73 is an indicator or pointer 77 which is adapted to rotate over a scale 78 on the shutter-setting mechanism cover 79, yet to be described. The divisions of the scale correspond to the notches 75 in the periphery of the disc 73.

A casing 79 is provided to enclose the shutter winding mechanism and has two holes to allow of the fixing of the milled head 68 and indicator 77 outside the casing.

When the shutter is mounted in an independent removable frame screwed to the camera casing, it will be necessary merely to remove the link 28 and a few screws in order to remove the shutter intact in its frame for repair or inspection.

The lens plate 102 carrying a lens 109 of known type is slidably carried by the front plate 3 in the usual way, is supported by a frame 103, so as to be capable of slight pivotal movement as indicated in Figure 2. The plate 102 is adapted to be moved about its pivotal axis 104 against the action of a spring 105 by means of a cam 106, adapted to bear on the rear of the plate 102 at or near to its base. The cam 106 consists of a disc fixed at an angle on a rotatable rod 107 arranged longitudinally of the camera and provided with a milled head 108 to facilitate operation. In a modified form the lens plate 102, Figures 25 and 26, is tilted by a multithreaded screw 146 which engages in a nut 147 pivoted on trunnions 149 in a slotted extension 148 of the plate 102, the screw having a milled head 108. The plate 102 is limited in its pivotal movements about its pivots 104 by the reduced portions 150, 151 engaging with the adjacent parts of the frame 103, the lens plate 102 being shaped at its rear to permit of the necessary movement. The tail board 9 has suitable spring catches for holding it in the closed position for instance catches 163, Figure 27, pivoted to the board and provided with springs 164. The catches snap behind inturned edges on the casing 6.

Assuming that the camera be in its folded or collapsed condition, as shown in Figure 3, and that it is desired to use the camera, it is first extended by pressing in and releasing the catches 163, folding down the tail board 9, raising the hood 5, and drawing forward the front plate 3 by finger pieces or draw lugs 162, until the catch 82 engages within the spring catch 83. The wing nut 23 is then rotated to bring the focussing screen 20 horizontal. The parts including the mirror 18 then assume the positions indicated in Figure 2. The operator can then focus a view in the screen 20, having previously set and wound the shutter. On exposure of a plate or film, effected by pressing the pin 37 the mirror 18 automatically moves out of the path of the light rays and the shutter is operated according to its previous setting.

In order that the operation of the details may be understood it will be assumed that an exposure has been effected and the parts are about to be re-adjusted.

Figure 7:
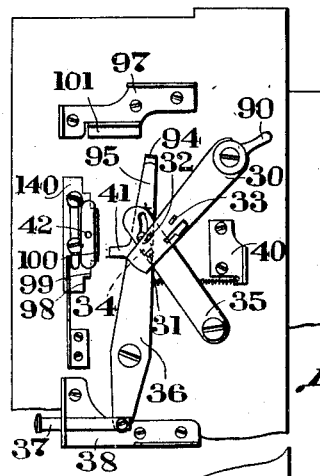

The mirror handle 90 is first turned until the stop 32 slips below and engages with the latch stop 34 on the lever 35, Figure 7, that is to say, until the stop 31 arrests the lever 30 with the mirror at an angle of 45 degrees to the horizontal, it being retained in this position against the action of the spring 25. This operation of the handle 90 also actuates the lever 29, by means of the crank 26, link 28 and crank 27, (Figure 14), so as to allow it to recede from the pin 81 on the pawl 80, whereby the pawl 80 is brought into engagement with the teeth of the gear wheel 66 by means of the spring 91, as shown in Figures 13 and 14. Next, the pin 42, projecting through the casing 87 on the side 7 of the camera is set to the desired indication, say, "instantaneous" which brings the stepped plate 140 into the position shown in Figure 7. The indicator 77 is then set to the exposure desired, say $\frac{1}{10}$ second. The milled head 68 is then turned to rotate the pinion 61 through the gear wheel 64 and consequently the rollers 45, 49 and 50. The amount of rotation which can be given is governed by the mechanism carried on the shaft 65. The pin 71 on the gear wheel 64 when in the unwound position is in contact with the pin 70 on the sector shaped plate 69. When the shutter is wound this pin 71 describes a circular path and strikes the pin 70 on the other side. On continued rotation the sector-shaped plate 69 is carried round with the gear wheel 64 because of the engagement of the pins 70 and 71. The rotation is able to continue until the end of the arcuate slot 72 in the sector-plate comes into contact with the pin 74 on the disc 73 when further rotation is impossible since the disc 73 is held fast on the shaft 65 by means of the spring tooth 76 engaging with the notches 75 in its periphery. Now since the position of the disc 73 and consequently of the pin 74 is controlled by the indicator 77 it will be seen that the said indicator in reality governs the amount of rotation which can be given to the shutter rollers.

When the milled head 68 is turned as described the spindle 51 is rotated through the medium of the gear wheels 66, 65 and pinion 61. The rollers 45, 49 and 50 thereupon wind up the shutters 43, 44 from the lower spring rollers 46, and 48. In the unwound position the roller blinds 43 and 44 are in the position indicated in Figure 17, the sensitive plate or film being indicated by the dotted rectangle 92. The roller blind 44 is made shorter than the blind 43 so that on continued winding up of the roller blinds a position is arrived at, shown in Figure 18, in which the blind 44 can be wound up no further. On still further rotation of the spindle 51 the centre roller 45, being pinned to the spindle, continues to wind up the blind 43. The rollers 49 and 50, however, slip on the shaft 51 since they are driven by the spindle 51 through the friction of the spring washers 56. The ratchet members 52, 53 continue to rotate. The blind 43 therefore overtakes the blind 42 until a position such as shown in Figure 19 is reached, an aperture 93 being formed where the openings in the two blinds overlap. This opening, it will be seen, varies with the amount of rotation given to the spindle 51; that is to say, the more rotation given to the spindle 51, the larger will be the aperture 93. Now the amount of rotation given to the spindle 51 is governed by the indicator 77, so that the said indicator 77 controls the size of the exposure aperture 93.

The next step in the operation of the camera is to release the roller blinds so that they are rewound on the lower spring rollers 46 and 48, and consequently so that the exposure aperture 93 passes over the front of and exposes the sensitive plate or film. The blinds are released by pressing in the operating pin 37. This oscillates the lever 36 until the projection 41 on it comes into engagement with the step 100 on the plate 140. The lever 35, being connected to the lever 36, is also oscillated, so that the latch stop 34 on said lever 35 is moved out of engagement with the stop 31 on the stop lever 30, thus allowing the stop lever 30 and consequently the mirror frame and mirror to be moved into a horizontal position by the spring 25, the movement being limited by the engagement of the stop lever 30 with a buffer 101 carried by a bracket 97 secured to the side 7 of the main camera body 1. In the case of "instantaneous" exposure the stop 94 on the lever 36 passes between the stops 32 and 33 as the stop lever 30 rises. The position of the lever 36, when the operating pin 37 is fully depressed, is indicated in broken lines in Figure 6. The lever 30 is prevented from oscillating, after striking the buffer, by the stop 145' which in this position of the parts is situated between the spring 95 and the stop 94, as hereinbefore described. On release of the operating pin 37 the levers 36 and 35 return to the normal position as illustrated in Figure 6 in full lines. When the mirror rises into the horizontal position the crank 26 on the end of the mirror spindle 21, Figure 14, turns the lever 29 through 45 degrees, by means of the link 28 and crank 27, until the lever 29 comes into contact with the pin 81 on the detent 80, and then disengages the said detent from the gear wheel 66. The wheel 66 is thereby released and the shutter is operated and the instantaneous exposure is made. Figure 20 illustrates the exposure aperture 93 passing over the face of the sensitized plate or film 92. When the roller blinds are released the blind 44 is fully wound up on its spring roller 48 before the blind 43 is fully wound on the roller 46. In order to allow the blind 43 to overtake the blind 44 so that they may return to the normal position as shown in Figure 17, the ratchet clutch members 52 overrun the members 53 so that the roller 45 may continue to rotate until the blind 43 is fully wound upon the spring roller 46, while the rollers 49 and 50 remain stationary.

Figure 8:
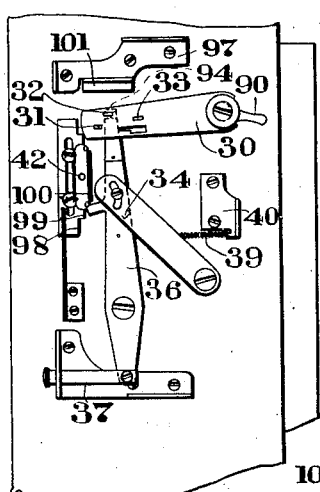
Figures 8 and 9 are similar views showing the mechanism in the positions for time exposure.
Figure 9:
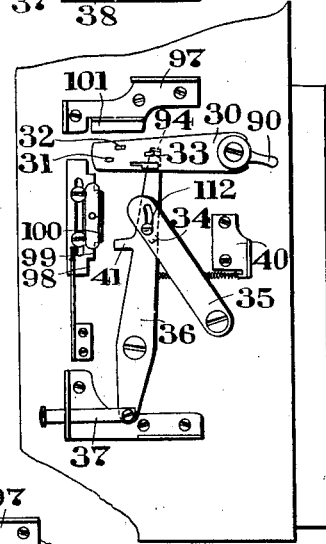

In "time" operation, the indicator 77 is turned to the time indication T, as also is the pin 42 of the stepped plate 140. The shutter is then wound as above described. In this case, as well as in the case of "ball" operation, the shutter blinds when wound, will have the position shown in Figure 21. When the operating pin 37 is pressed the projection 41 on the timing lever 36 comes into contact with the step 99 on the stepped plate 140. The stop lever 30 is prevented from reaching its extreme upward position by engagement of its centre stop 32 with the timing lever stop 94, as shown in Figure 8, and on release of the operating pin it is still prevented from reaching the extreme upward position by engagement of its third stop 33 with the stop 94 of the timing lever 36 as in Figure 9. The lever 29, actuated as before by the crank 26 on the mirror spindle 21, link 28 and crank 27, Figure 14, thrusts the detent 80 away from and releases the wheel 66, but the lever 29 is this time brought into engagement with the stop 96 on the gear wheel 66 as the said wheel rotates thus preventing further rotation of the wheel 66 and thereby arresting the shutter blinds in the open aperture position shown in Figure 22. After the required time for exposure has elapsed the operating pin 37 is again depressed, whereupon the timing lever 36 is oscillated so that the mirror stop lever 30 passes to the horizontal position, the stop 94 on the timing lever passing between the stops 31 and 33 on the stop lever 30. At the same time the lever 29 is brought out of engagement with the stop 96 on the gear wheel 66, thus allowing the shutter to close.

Figure 10:
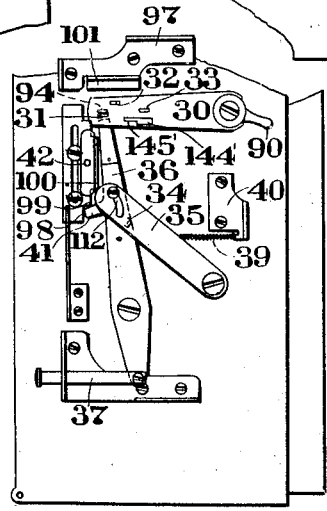
Figure 10 is a similar view showing the mechanism in position for ball exposure.

For "ball" operation the pin 42 of the stepped plate 140 is moved to the "ball" indication B. The indication B for the indicator 77 is, in the same position as that of T for "time" operation. The operating pin 37 is depressed and retained in the depressed position for the desired time of exposure. The effect of this depression is to bring the projection 41 on the timing lever 36 into engagement with the step 98 on the plate 140, as shown in Figure 10. In this case the stop lever 30 is prevented from reaching the horizontal position by engagement of the stop 31 with the stop 94 on the timing lever. As in the case of "time" operation, the lever 29 connected to the other end of the mirror spindle 21 releases the shutter to the open aperture position. On release of the operating pin 37, the stop 94 on the timing lever 36 passes between the stops 31 and 33 on the stop lever 30, thus enabling the stop lever to reach the extreme horizontal position at the same time allowing the shutter to close through the medium of the lever 29.

In closing or collapsing the camera the catch 24 retaining the focussing screen 20 in the horizontal position is released by pressure on the spring finger piece 83 on the tail board 9 as hereinbefore described. The focussing screen 20 then falls and carries with it the mirror 18 and frame 17 to the vertical position, as shown in Figure 3. The hood 5 is adapted to be folded down over the lens and is covered in such position by suitable closing or reinforcing plates 110, 111, so that in the collapsed position one plate 110, extends along the top of the camera body 1, to the turned over edge of the hood 5, while the other plate 111 folds over said edge, a complete closure being effected by moving the tail board 9 into the vertical position so that its front edge meets the free edge of the plate 111, and the catches 163 engage with the inturned edges of the casing 6.

I claim—

1. A folding or collapsible reflex camera of the type referred to, comprising a rigid camera body, a sliding front adapted to carry a focussing lens tube, flexible walls, and a flexible bottom directly connecting said sliding front to said rigid camera body, and a foldable focussing hood connected to the upper parts of said front, rigid body, flexible walls, and flexible bottom, and a focusing element connected with a sliding front.

2. A folding or collapsible reflex camera of the type referred to, comprising a rigid camera body, a sliding front adapted to carry a focussing lens tube, flexible walls, and a flexible bottom directly connecting said sliding front to said rigid camera body, a foldable focussing hood connected to the upper parts of said front, rigid body, flexible walls, and flexible bottom, the sides and bottom of said rigid body being extended, a tail board hinged to said extended bottom, and provided with guides for said sliding front, and a focusing element operated in the movement of the sliding front and holding the same in operative position.

3. A folding or collapsible reflex camera of the type referred to comprising a dark chamber consisting of a rigid camera body, a sliding front, adapted to carry a focussing lens tube, and flexible walls and a flexible bottom, directly connecting said sliding front to said rigid body, a focussing hood connected to said dark chamber, a focussing screen hinged to said body, automatic means on the sliding front for engaging with said focussing screen, for the purpose of enabling said screen, when in the operative position between said dark chamber, and said hood to hold said sliding front rigidly in its extended position, and means for releasing said holding means, for the purpose of facilitating rapid collapse of the camera substantially as and for the purpose hereinbefore set forth.

4. A folding or collapsible reflex camera of the type referred to, comprising a dark chamber, consisting of a rigid body, a sliding front, adapted to carry a focussing lens tube, and flexible walls and a flexible bottom directly connecting said sliding front to said rigid body and focussing hood connected to said dark chamber, a hinged focussing screen, adapted to be interposed between said hood and dark chamber, a pivoted mirror within said dark chamber for reflecting the image on said focussing screen, a spring for moving said mirror into its inoperative position, a self-capping focal plane shutter in said body, means operable by said mirror for releasing said shutter, means for retaining said mirror in an operative position and an operating pin for releasing said mirror retaining means for the purpose of releasing said mirror and said shutter simultaneously, substantially as hereinbefore set forth.

5. In a folding or collapsible reflex camera of the type referred to, a pivoted mirror, adapted to assume two different inoperative positions, during "instantaneous" and "time" and "ball" operations, a spring for moving said mirror into said inoperative positions, means for holding said mirror in its operative position against the action of said spring, a self-capping focal plane shutter, winding mechanism for said shutter, means operatively connected to said mirror for releasing and arresting said winding mechanism, and means operable and adjustable by the operator for releasing the aforesaid mirror holding means and for arresting said mirror in one of its inoperative positions corresponding to "time" and "ball" operations, and fixed means for arresting said mirror in its other inoperative position, corresponding to "instantaneous" operation, substantially as and for the purpose hereinbefore set forth.

6. In a folding or collapsible reflex camera of the type referred to, a pivoted mirror, a spring for moving said mirror into an inoperative position, means for holding said mirror in an operative position against the action of said spring comprising a stop lever connected to the mirror having a number of stops and a lever having a latch for engaging with one of said stops, a timing lever having a stop adapted to cooperate with said stops, an indicator operable by the operator and having means for limiting the oscillatory movements of the timing lever, for the purpose of determining which of the stops on the said stop lever are to be engaged by the stop on said timing lever corresponding to "time," "ball," and "instantaneous" operation, an operating pin for oscillating said timing lever, said timing lever being operatively connected to the aforesaid latch lever, for the purpose of releasing the aforesaid stop lever when said timing lever is moved by pressure on said operating pin, a self-capping focal plane shutter, winding mechanism for said shutter, means for retaining said winding mechanism when wound, and means operatively connected to said mirror for releasing said winding mechanism, when said operating pin is actuated to oscillate said timing lever, substantially as and for the purpose hereinbefore set forth.

7. In a folding or collapsible reflex camera of the type referred to, a pivoted mirror, a spring for moving said mirror into an inoperative position, means for holding said mirror in an operative position against the action of said spring, comprising a stop lever connected to the mirror having a number of stops and a lever having a latch for engaging with one of said stops, a timing lever having a stop adapted to cooperate with said stops, an indicator operable by the operator and having means for limiting the oscillatory movements of the timing lever, for the purpose of determining which of the stops on the said stop lever are to be engaged by the stop on said timing lever corresponding to "time," "ball" and "instantaneous" operation, an operating pin for oscillating said timing lever, said timing lever being operatively connected to the aforesaid latch lever, for the purpose of releasing the aforesaid stop lever when said timing lever is moved by pressure on said operating pin, a self-capping focal plane shutter, winding mechanism for said shutter, including a toothed wheel carrying a stop, a detent for engaging with the teeth of said wheel, an oscillatory lever operatively connected to said mirror for engaging with said detent and with the stop on said wheel respectively for releasing said winding mechnism and for arresting said winding mechanism for "ball" and "time" operation, the degree of oscillation of said oscillatory lever being determined by the degree of oscillation of the mirror and its stop lever, which is determined by the particular stop on said stop lever engaged by the aforesaid timing lever, which engagement is determined by the degree of oscillation of said timing lever, which is in turn determined, by the aforesaid indicator, substantially as and for the purpose hereinbefore described.

8. In a folding or collapsible reflex camera of the type referred to, a pivoted mirror, a spring for moving said mirror into an inoperative position, means for holding said mirror in an operative position against the action of said spring comprising a stop lever connected to the mirror having a number of stops and a lever having a latch for engaging with one of said stops, a timing lever having a stop adapted to cooperate with said stops, an indicator operable by the operator and having means for limiting the oscillatory movements of the timing lever, for the purpose of determining which of the stops on the said stop lever are to be engaged by the stop on said timing lever corresponding to "time" "ball" and "instantaneous" operation, an operating pin for oscillating said timing lever, said timing lever being operatively connected to the aforesaid latch lever, for the purpose of releasing the aforesaid stop lever when said timing lever is moved by pressure on said operating pin, a self-capping focal plane shutter, winding mechanism for said shutter, means for retaining said winding mechanism when wound, setting mechanism for regulating the degree of winding of the winding mechanism, and means operatively connected to said mirror for releasing said winding mechanism when said operating pin is actuated to oscillate said timing lever, substantially as and for the purpose hereinbefore set forth.

In testimony whereof I have signed my name to this specification.

PERCY GEORGE MASON.